Patented Oct. 2, 1934

1,975,588

UNITED STATES PATENT OFFICE 1,975,588

CARBON DISULPHIDE REACTION PRODUCTS AND PROCESS OF MAKING SAME

Donald H. Powers, Pennsgrove, N. J., assignor to E. I. du Pont de Nemours & Company, Wilmington, Del., a corporation of Delaware No Drawing. Application June 27, 1929, Serial No. 374,292

22 Claims. (Cl. 260—130)

This invention relates to a new class of products and the process of preparing the same. More specifically, it relates to a class of compounds resulting from the interaction of acetaldehyde, primary aromatic or aliphatic amines and carbon disulphide.

This application is in the nature of a continuation in part of my previous applications Serial No. 34,732, filed June 3, 1925, Patent 1,732,532, Serial No. 140,692, filed October 9, 1926, and Serial No. 140,693, filed October 9, 1926. Application Serial No. 34,732 discloses broadly products resulting from the interaction of an aldehyde, a primary amine and carbon disulphide and is more particularly directed to such products when obtained from aliphatic aldehydes and aliphatic amines in general. Applications Serial No. 140,692 and Serial No. 140,693 are directed to the products obtained from aldehydes containing a plurality of carbon atoms, primary amines and carbon disulphide and more specifically are directed to the products obtained from aniline, butyraldehyde, and carbon disulphide.

It has been now discovered that the products resulting from the condensation of acetaldehyde, primary aromatic or aliphatic amines and carbon disulphide are of peculiar value in a number of commercial applications, among which may be mentioned their use as inhibitors of acid corrosion and as accelerators for the vulcanization of rubber.

The preparation of the new class of compounds may be best disclosed by the presentation of a number of examples. It is to be understood that these examples are purely illustrative and that the conditions, reagents, and proportions therein specified are susceptible of variation.

The examples follow:

Example 1

2 moles of aniline are added slowly to 2 moles of acetaldehyde, held at 42–43° C. over a period of 30 minutes. The mixture is held 2 hours at 60° C. then steam distilled to remove unreacted aniline. 2.6 moles of carbon disulphide are then added and the mixture refluxed 10 hours at 50° C. The product is dried in vacuo at 65° C.

Example 2

2 moles of acetaldehyde are added to 1 mole of carbon disulphide and the mixture cooled in an ice bath. 2 moles of aniline are added slowly, with agitation. The mass soon solidifies. It is heated up to about 70° C. and then allowed to solidify.

Example 3

1 mole of aniline is mixed with 1 mole of carbon disulphide, the temperature being held at or below 40° C. during the mixing, and for an additional 30 minutes with agitation. 3 moles of acetaldehyde are then added with stirring and the temperature is allowed to rise gradually to 60 to 70° C.

The mixture of aniline and carbon disulphide is held at low temperature in order to avoid the formation of thio-carbanilid, which would take place at higher temperatures, with the liberation of hydrogen sulphide.

Example 4

1 mole of aniline, 1 mole of acetaldehyde and 3 moles of carbon disulphide are added simultaneously to a container, the materials as they mix in this container being cooled to about 35° C. during the addition. The mixture is then heated gradually to 70° C. and held there for 2 hours. The product is then heated under vacuum to distill off the excess carbon disulphide and any other volatile substances.

Example 5

1 mole of butyl amine is mixed with 1 mole of acetaldehyde and the mixture is stirred for 40 minutes at a temperature of approximately 45° C. The temperature is then raised to 55° C. and held 2 hours. 1.3 moles of carbon disulphide are then added and the mixture is refluxed for 12 hours. The product is then heated in vacuo to remove volatile products.

It will be understood that butyl amine in the above example is only illustrative of the use of an aliphatic amine and that other primary aliphatic amines may be used to form products of this kind, such for example as propyl amine, amyl amine, etc.

It will be obvious from the above examples that the proportions of the three components employed may be widely varied. Thus, valuable products have been obtained when from 1 to 3 or even more than 3 moles of carbon disulphide are employed for each mole of amine. Moreover, the quantity of acetaldehyde to amine may be varied within wide limits. Thus, valuable products have been obtained by using anywhere from 1 to 5 moles of acetaldehyde to 1 mole of amine. The invention therefore is not limited to specific proportions of the reagents. However, in the preferred embodiment of the invention substantially equal molecular proportions of aniline, acetaldehyde and carbon disulphide are reacted, although it is often advisable to use a slight excess of carbon disulphide to allow for losses during the reaction.

The products of the invention are very high boiling, viscous liquids, dark in color and with a characteristic odor. An increase in the proportion of aldehyde employed results in certain changes in properties. When the products, for example, are used as accelerators, an increase in the aldehyde up to a certain point increases their activity. With increasing aldehyde the products also tend to become less soluble in acid, and therefore less valuable as acid inhibitors. An increase in the proportion of carbon bisulphide, of course, results in an increase in the amount of combined sulphur, and therefore tends to increase accelerating activity but to decrease solubility in acid. All of the products, however, exhibit marked ability to inhibit corrosion due to the action of non-oxidizing acids, such as sulphuric and hydrochloric acids on metals and all are effective accelerators for the vulcanization of rubber.

It will also be obvious from the above examples that the reagents may be brought together in various ways. Thus, the acetaldehyde, amine and carbon disulphide may be introduced into the vessel at substantially the same time; the acetaldehyde and amine may be first reacted and the resulting product treated with the carbon disulphide; the amine and carbon disulphide may be first introduced into the vessel and when the reaction is completed the product treated with the acetaldehyde; or, finally, the acetaldehyde and carbon disulphide may be first mixed together and the amine thereafter introduced into the mixture.

Further, it will be obvious from the examples that either primary aromatic or aliphatic amines may be employed. Obviously, also, other primary amines than those specifically disclosed in the examples, may be employed. Thus valuable compounds may be obtained by substituting, for example, the toluidines and xylidines, for aniline, and products of value may also be obtained from the naphthylamines.

The products obtained as illustrated in the examples are of indefinite constitution but contain in combination substantially all of the elements of the respective reagents with the exception of the elimination of water. When amine and carbon disulphide are admixed the reaction is carried out at low temperatures and under these conditions hydrogen sulphide is not evolved or, at least, is not evolved in more than incidental amounts. The production of thiourea in substantial amounts, which would defeat the purposes of the invention, is thus avoided. When aldehyde and amine are first reacted and carbon disulphide thereafter added, hydrogen sulphide is not evolved.

The products of the invention sharply differ from the known products of Delepine (see Bulletin de la Societe Chemique de Paris, 3d Series, vol. 15, p. 898) which products are made from ammonia and do not have accelerating properties.

As many apparent and widely different embodiments of this invention may be made without departing from the spirit thereof, it is to be understood that I do not limit myself to the foregoing examples or description except as indicated in the following claims.

I claim:

1. The product obtained by the chemical combination of acetaldehyde, a primary amine and carbon disulphide without liberation of substantial quantities of hydrogen sulphide.

2. The product obtained by the chemical combination of acetaldehyde, a primary aromatic amine and carbon disulphide without liberation of substantial quantities of hydrogen sulphide.

3. The product obtained by the chemical combination, without liberation of substantial quantities of hydrogen sulphide, of acetaldehyde, aniline and carbon disulphide.

4. The product obtained by the chemical combination, without liberation of substantial quantities of hydrogen sulphide of from 1 to 5 moles of acetaldehyde, 1 mole of a primary amine and carbon disulphide.

5. The product obtained by the chemical combination, without liberation of substantial quantities of hydrogen sulphide, of from 1 to 5 moles of acetaldehyde, 1 mole of a primary aromatic amine and carbon disulphide.

6. The product obtained by the chemical combination, without liberation of substantial quantities of hydrogen sulphide, of from 1 to 5 moles of acetaldehyde, 1 mole of aniline and carbon disulphide.

7. The product obtained by the chemical combination, without liberation of substantial quantities of hydrogen sulphide, of 1 mole of a primary aromatic amine, substantially 1 mole of acetaldehyde and substantially 1 mole of carbon disulphide.

8. The product obtained by the chemical combination, without liberation of substantial quantities of hydrogen sulphide, of 1 mole of aniline, 1 mole of acetaldehyde and 1 mole of carbon disulphide.

9. The product obtained by reacting from 1 to 5 moles of acetaldehyde with 1 mole of a primary amine and treating the product so formed with carbon disulphide.

10. The product obtained by reacting from 1 to 5 moles of acetaldehyde with 1 mole of a primary aromatic amine and treating the product so formed with carbon disulphide.

11. The product obtained by reacting acetaldehyde with aniline and treating the product so formed with carbon disulphide.

12. The product obtained by first reacting 1 mole of aniline with substantially 1 mole of acetaldehyde and thereafter treating the resulting product with substantially 1 mole of carbon disulphide.

13. The process of preparing a new product which comprises reacting, without liberation of substantial quantities of hydrogen sulphide, acetaldehyde, a primary amine and carbon disulphide.

14. The process of preparing a new product which comprises reacting, without liberation of substantial quantities of hydrogen sulphide, acetaldehyde, a primary aromatic amine and carbon disulphide.

15. The process of preparing a new product which comprises reacting, without liberation of substantial quantities of hydrogen sulphide, acetaldehyde, aniline and carbon disulphide.

16. The process of preparing a new product which comprises reacting, without liberation of substantial quantities of hydrogen sulphide, 1 mole of a primary amine, substantially 1 mole of acetaldehyde and substantially 1 mole of carbon disulphide.

17. The process of preparing a new product which comprises reacting, without liberation of substantial quantities of hydrogen sulphide, 1 mole of aniline, substantially 1 mole of acetaldehyde and substantially 1 mole of carbon disulphide.

18. The process of preparing a new product which comprises reacting acetaldehyde with a primary amine and treating the product so formed with carbon disulphide.

19. The process of preparing a new product which comprises reacting acetaldehyde with a primary aromatic amine and treating the product so formed with carbon disulphide.

20. The process of preparing a new product which comprises reacting 1 mole of aniline with 1 mole of acetaldehyde and thereafter treating the resulting product with substantially 1 mole of carbon disulphide.

21. The product obtained by the chemical combination of acetaldehyde, a primary aliphatic amine and carbon disulphide without liberation of substantial quantities of hydrogen sulphide.

22. The process of preparing a new product which comprises reacting, without liberation of substantial quantities of hydrogen sulphide, one mole of butyl amine, substantially one mole of acetaldehyde and from 1 to 3 moles of carbon disulphide.

DONALD H. POWERS.